April 10, 1951     A. C. RIPKE     2,548,394
TRANSMISSION
Original Filed Nov. 26, 1945
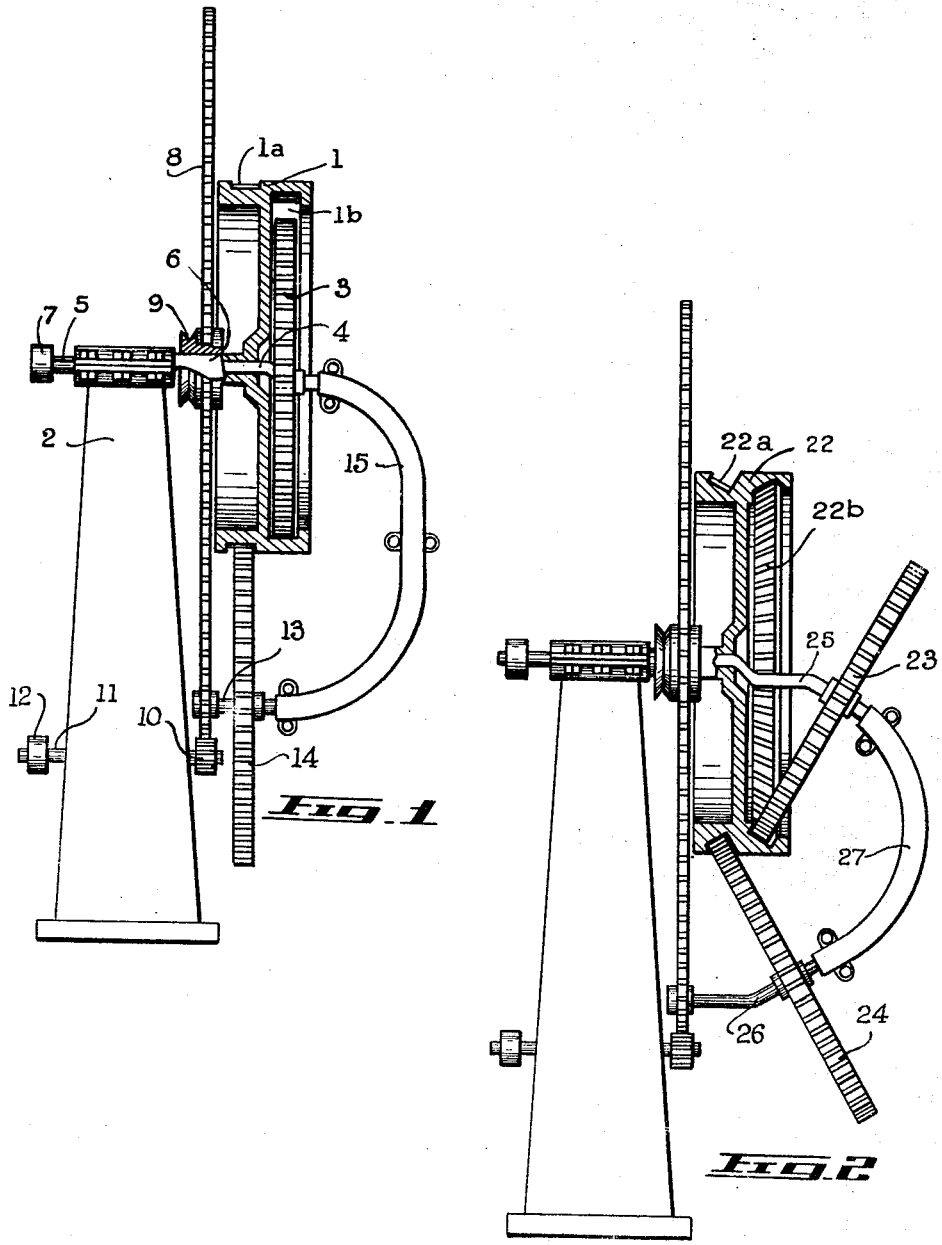
Inventor
AUGUST C. RIPKE
by *W. Irwin Haskett*
Attorney.

Patented Apr. 10, 1951

2,548,394

UNITED STATES PATENT OFFICE 2,548,394

TRANSMISSION

August C. Ripke, Austin, Minn.

Original application November 26, 1945, Serial No. 630,800. Divided and this application September 24, 1949, Serial No. 117,657. In Canada September 23, 1942

7 Claims. (Cl. 74—797)

This invention relates to improvements in a transmission and appartains particularly to one employing a novel planetary gear assembly.

This application is a division of my Patent No. 2,495,824, issued January 11, 1950.

An object of the invention is to provide a novel and compact mechanism for transmitting power from a driving shaft to a driven shaft in a desired speed and/or power ratio.

A further object of the invention is to provide a planetary gear type of transmission in which a compound gear is engaged internally by an hypocyclical gear pinion connected by a suitable flexible or direction changing coupling with an epicyclical gear externally engaging said compound gear.

A still further object of the invention is the provision of a transmission mechanism of the nature and for the purpose specified that is characterized by structural simplicity, extensive and versatile utility and reasonable cost of production, operation and maintenance whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a sectional-elevation of one embodiment of my transmission; and

Figure 2 is a comparable sectional-elevation of a modification of the device wherein the pinions engaging the compound gear are in angular position, reducing the arc through which the intermediate coupling extends.

My transmission is of the planetary gear type and comprises a fixed compound annular gear or gear ring 1 mounted on a standard 2 from which it is laterally offset. The gear 1 has an exterior gear trough 1a and an interior gear trough 1b of the same radius. An hypocyclical gear pinion 3 runs in the interior trough 1b and is mounted for rotation on the crank end 4 of a shaft 5 that extends axially through the compound gear ring 1 whose hub 6 is offset to the supporting standard 2. The far end of the shaft 5, beyond the standard, has a pulley 7 adapted to be driven by any suitable means.

Mounted to rotate on the gear ring's offset hub 6 is a large disk or gear 8 and a pulley or pulley-like hub 9 applied laterally thereto. The former meshes with a pinion 10 on a shaft 11 then passes through the standard 2 near the bottom thereof and carries a pulley 12 on its other end from which power may be taken. Near its circumference this large disk or gear 8 carries a stub shaft 13 that serves as an axle spindle for rotatably supporting an epicyclical gear 14 that runs in the exterior trough 1a. The gear troughs 1a and 1b of the compound gear ring 1 and the pinions 3 and 14 meshing respectively with such troughs are shown as having suitable gear teeth.

A coupling 15 connects the hubs of the gears 3 and 14; a flexible Bowden-type wire or a series of shafts with universal joints being useable but I prefer the simple and highly efficient direction-changing coupling disclosed in my parent and copending application aforementioned.

In operation, when power is applied to the pulley 7, it drives the hypocyclical gear pinion 3, on the far cranked end 4 of the shaft 5, around its interior trough 1b causing the pinion to rotate and this movement is communicated by means of the shaft coupling to the second epicycylical gear pinion 14 that runs around the exterior trough 1a, being confined thereto in its travel by the large gear or disk 8 that, being so driven, turns its pinion 10 that power may be selectively taken off the concentric pulley 9 or, at higher speed, off the lower pulley 12.

In the modified form shown in Figure 2 troughs 22a and 22b of the compound gear 22 are cut at an angle and the meshing gear pinions 23 and 24 carried on the angularly bent ends of their respective shafts 25 and 26 lean outwards at approximately 30° from the vertical. The operation is identical with that described in the previous form except that the coupling 27 is carried through a reduced arc.

From the foregoing description taken in connection with the accompanying drawings, it will be manifest that a transmission is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new is:

1. A transmission comprising a stationary compound gear having external and internal gear troughs, an hypocyclical gear pinion in the interior trough and an epicyclical gear in the exterior trough of said compound gear; a driving shaft passing coaxially through said compound gear and having a crank on the end thereof on which said hypocyclical gear pinion is rotatably mounted; a coupling connecting said hypocyclical gear pinion and said epicyclical gear; an annular rotatable member coaxial with said drive shaft having a pulley-like hub; and a stub shaft extending from said member on which said epicyclical gear is mounted.

2. The combination with the structure set forth in claim 1 and wherein said compound gear has an offset hub extending along said driving shaft and on which offset hub said annular member is rotatable.

3. The combination with the structure set forth in claim 1 and wherein said annular rotatable member is a gear; of a rotatable shaft; a gear pinion thereon meshing with said annular rotatable member; and a pulley on said rotatable shaft.

4. A transmission mechanism comprising a standard, a pulley shaft journalled therein, a crank on the end thereof, a stationary, standard-mounted, compound gear on said shaft having interior and exterior tooth geared troughs of equal diameter, an hypocyclical gear pinion in the interior trough of said compound gear and mounted on the crank end of said shaft, a large gear wheel rotatable on the hub of said compound gear, a stub shaft on said large gear wheel near its circumference, an epicyclical gear thereon and meshing with the exterior geared trough of said compound gear and a coupling between said shafts.

5. A transmission mechanism comprising a standard, a pulley shaft journalled therein, a crank on the end thereof, a stationary, standard-mounted, compound gear on said shaft having interior and exterior tooth geared troughs of equal diameter, an hypocyclical gear pinion meshing with the interior trough thereof and mounted on the crank end of said shaft, a large gear wheel rotatable on the hub of said compound gear, a stub shaft on said large gear wheel near its circumference, an epicyclical gear thereon and meshing with the exterior geared trough of said compound gear, a coupling between said shafts, and a "take off" pulley mounted coaxially on said large gear wheel.

6. A transmission mechanism comprising a standard, a pulley shaft journalled therein, a crank on the end thereof, a stationary, standard supported, compound gear with an offset hub on said shaft and having interior and exterior tooth geared troughs of equal diameter, an hypocyclical gear pinion meshing in the interior trough thereof and mounted on the crank end of said shaft, a large gear wheel rotatable on the hub of said compound gear, a stub shaft on said large gear wheel near its circumference, an epicyclical gear thereon and meshing with the exterior geared trough of said compound gear, a coupling between said shafts, a "take off" pulley fastened laterally of said large gear wheel at its centre and rotatable also on the hub of said compound gear and a high speed "take off" comprising a shaft near the bottom of said standard, a pulley on one end thereof and a small pinion on the other end meshing with the said large gear wheel.

7. A transmission mechanism comprising a standard, a pulley shaft journalled therein, a crank on the end thereof, a stationary, standard-supported, compound gear on said shaft having interior and exterior tooth geared troughs of equal diameter, an epicyclical gear pinion in the interior trough thereof on the crank end of said shaft, a large gear wheel rotatable on the hub of said compound gear, a stub shaft on said large gear wheel near its circumference, a second, epicyclical gear pinion thereon and meshing with the exterior geared trough of said compound gear, a coupling between said shafts, a "take off" pulley laterally on said large gear wheel at its centre and rotatable on the hub of said compound gear, a rotatable shaft near the bottom of said standard with a pulley on one end thereof and a small pinion on the other end meshing with the said large gear wheel.

AUGUST C. RIPKE.

REFERENCES CITED

The following references are of record in the file of this patent:

UNITED STATES PATENTS

| Number | Name | Date |
|---|---|---|
| 395,677 | White | Jan. 1, 1889 |
| 548,350 | Blauvelt | Oct. 22, 1895 |
| 2,090,810 | Russell et al. | Aug. 24, 1937 |

FOREIGN PATENTS

| Number | Country | Date |
|---|---|---|
| 19,535 | Great Britain | Sept. 8, 1914 |